Nov. 12, 1935.  W. H. STANSBERRY  2,020,585
VISOR CONSTRUCTION
Filed April 3, 1933   2 Sheets-Sheet 1

Inventor
Warren H. Stansberry
By Liverance and
Van Antwerp
Attorneys

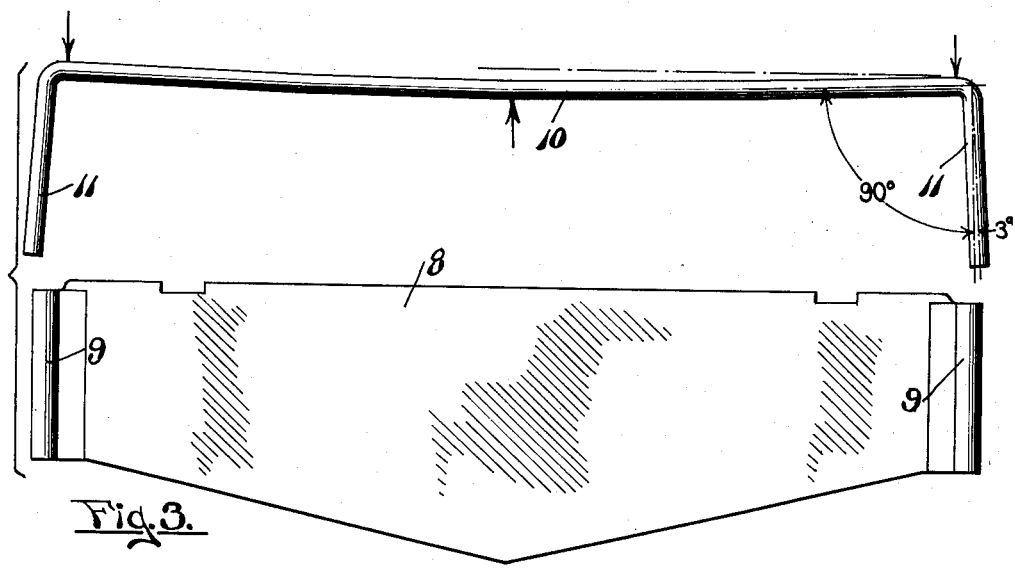
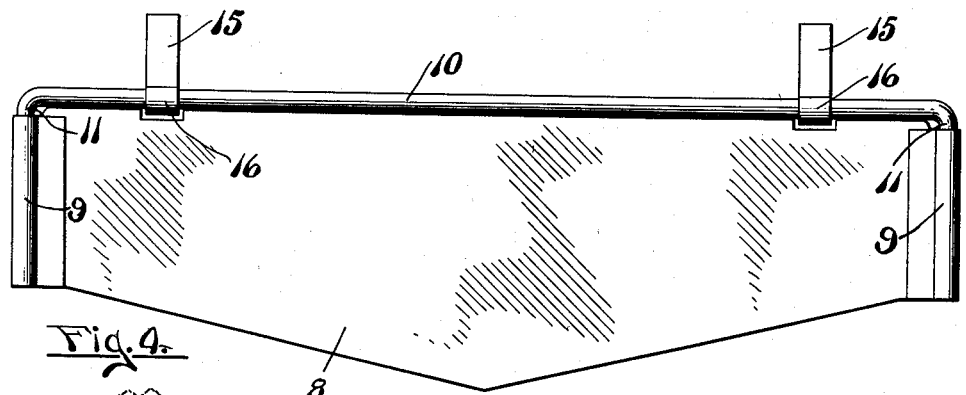
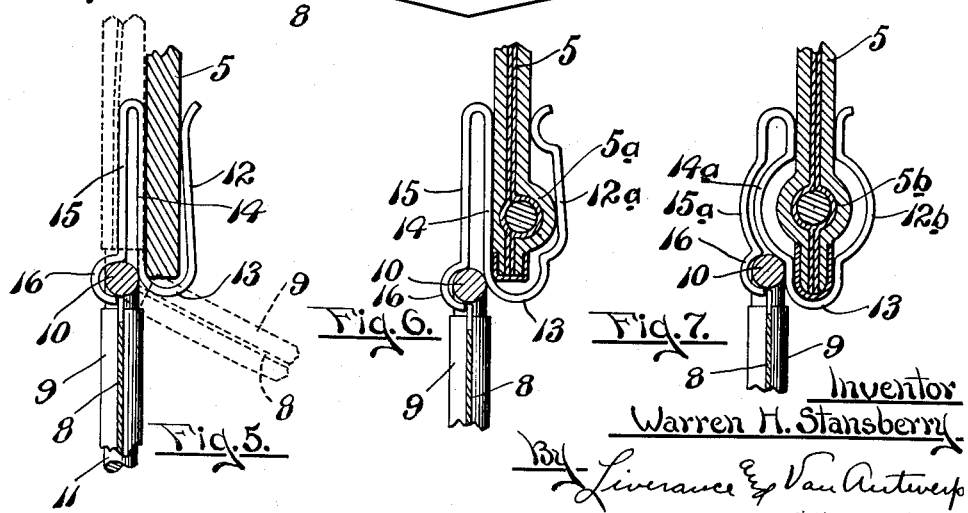

Patented Nov. 12, 1935

2,020,585

UNITED STATES PATENT OFFICE 2,020,585

VISOR CONSTRUCTION

Warren H. Stansberry, Grand Haven, Mich., assignor to Peerless Novelty Company, Grand Haven, Mich., a corporation of Michigan Application April 3, 1933, Serial No. 664,069

1 Claim. (Cl. 296—97)

This invention relates to a visor construction, and is more particularly concerned with respect to the construction and mounting of an auxiliary small visor or visorette at an edge of a permanently installed visor in an automobile, such visorette to be of a very simple and economical construction, readily and easily attached in a place on the main visor and adjustable to operative position or folded to inoperative position against the body of the main visor when it is not needed.

It is an object and purpose of the present invention to provide an auxiliary small visor construction to be readily attached to a larger or main visor, and to provide the same with simple and easily operated attaching means such that the auxiliary visor may be secured to the main visor without use of tools or skilled labor. It is a further object of the invention to provide an auxiliary visor of a flexible and preferably partly transparent material such as colored celluloid so that the same will not obscure vision though directly between the eyes and the objects to be seen. Many other objects and purposes than those stated, including a practical and simple way of constructing the auxiliary visor whereby the celluloid member is always maintained taut and does not wrinkle or buckle because of the high summer temperatures expanding the same, will be apparent upon an understanding of the invention, had from the following description, taken in connection with the accompanying drawings, in which, Fig. 1 is a fragmentary longitudinal section through the body of an automobile illustrating the application of my invention to the permanent visor of the automobile.

Fig. 3 is an elevation illustrating the manner in which the parts or members of the auxiliary visor are assembled.

Fig. 4 is an elevation of the complete auxiliary visor.

Fig. 5 is a fragmentary transverse section through the attaching means by which the auxiliary visor is attached to the permanent visor, and also showing the manner in which it may be adjusted to different angular positions and retained therein, and Figs. 6 and 7 are sections similar to Fig. 5 illustrating other forms of attaching the holding means similar to that shown in Fig. 5.

Like reference characters refer to like parts in the different figures of the drawings.

Figure 1:
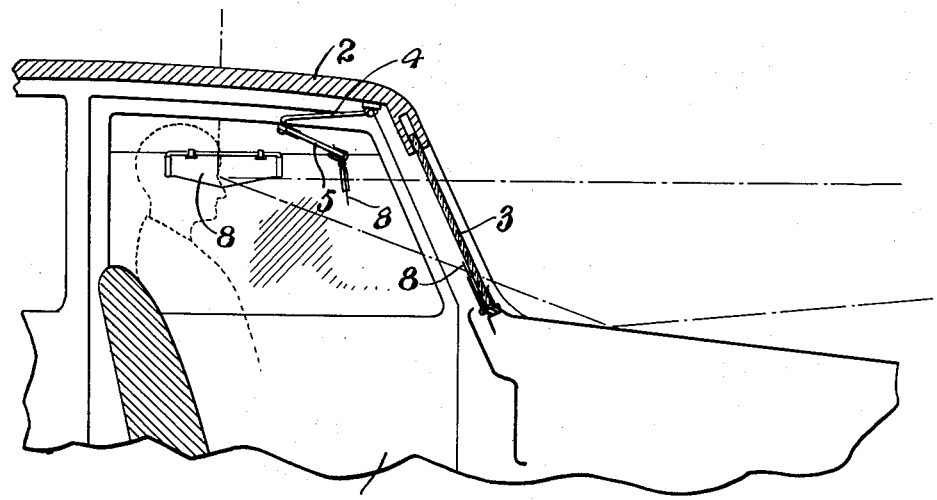

The automobile body 1 has the usual top 2 with a front glass windshield 3 behind which the driver sits. It is common practice in automobiles at the present time to supply the same with visor constructions for obstructing light rays coming to the eyes of the driver, such visors being mounted wtihin the bodies of the cars and back of their windshields.

One form of such visor includes a supporting rod 4 pivotally mounted at its front end at the underside of the top 2, at the rear end of which rod the visor 5 is carried. Preferably the connection of the rod 4 at its front upper end is by a ball or universal joint and in similar manner the rear end of the rod 4 may be turned downwardly, as at 4a, and supplied with a ball 6 at its end joining with a cooperating socket 7 which is permanently secured to the upper edge of the visor board or plate 5, which in the illustration shown is of substantially rectangular shape.

The member 5 is ordinarily opaque and no light rays pass therethrough. It may be brought to various positions between the driver and the windshield glass 3 but there is a limit to the downward position of this member as, being opaque, the driver must necessarily see the road underneath the same.

With my invention an auxiliary visor of a transparent or semi-transparent material is used, including a plate 8 which preferably is of colored celluloid, through which one can see but which absorbs or obstructs intense rays of light such as come from the sun when it is near the horizon.

This plate 8 at each end is provided with vertical sleeves 9 formed by looping the material back upon itself and cementing the free edge portions in place. The plate is carried by a U-shaped member of spring wire, including an upper rod 10 with downwardly extending end sections 11, one at each end thereof.

In assembling the celluloid plate 8 with the wire rod member it is desirable that the part 10 be initially formed with a downward bow at its center, whereby the ends 11 are not parallel to each other but diverge outwardly. The end members 11 are also initially formed to extend from the end portions of the rod 10 at an angle slightly greater than 90° as shown in Fig. 3. Then on assembly the rod 10 is subjected centrally to pressure to bow or curve it outwardly, this inclining the end members 11 inwardly so that the sleeves 9 may be freely slipped over the end members 11 whereupon, with the release of the member 10 from pressure, the parts 11 tend to spring outwardly and impart a longitudinal tension upon the celluloid sheet 8 holding it taut and smooth under all normal conditions.

Celluloid expands with increasing temperature and in the summer time, except for such tension as is supplied in the construction described, would be liable to buckle and not be held in a smooth taut condition; and the structure which I have produced insures that the auxiliary visor construction will always remain in a proper condition and not be wrinkled or buckled in any respect.

At spaced apart points in the length of the member 10 attaching clips are mounted. Each is made of a length of flat spring material bent into the form shown in Fig. 5. That is, there is a leg 12 connected by a U-shaped bend 13 with a substantially parallel leg 14, which in turn is bent back upon itself to make a section 15 parallel with the part 14 and terminating at its lower free end in a substantially semi-circular bead 16. Each of these clips is connected with the wire rod 10 by inserting the rod at the inner side of said bead 16 between it and the lower end of the leg 14; and the clips are adapted to be applied to the visor board 5 by inserting an edge thereof between the legs 12 and 14 to frictionally grip the board as shown in Fig. 5.

It will be evident with this construction that the visor board 5 may be adjusted to any desired position within the range of adjustment permitted by its mounting by the rod 4, and that the auxiliary visor plate 8 may be turned to different positions such as indicated in both full and dotted lines in Fig. 5; and the frictional grip exerted by the bearing of the bead 16 against rod 10 and it in turn against the lower end of the leg 14 retains the auxiliary visor in any position to which it is adjusted. In this manner the colored celluloid plate 8 may be brought in front of the eyes of the driver so as to eliminate intense rays of light, as from the sun or high powered headlights of approaching vehicles.

Figure 2:
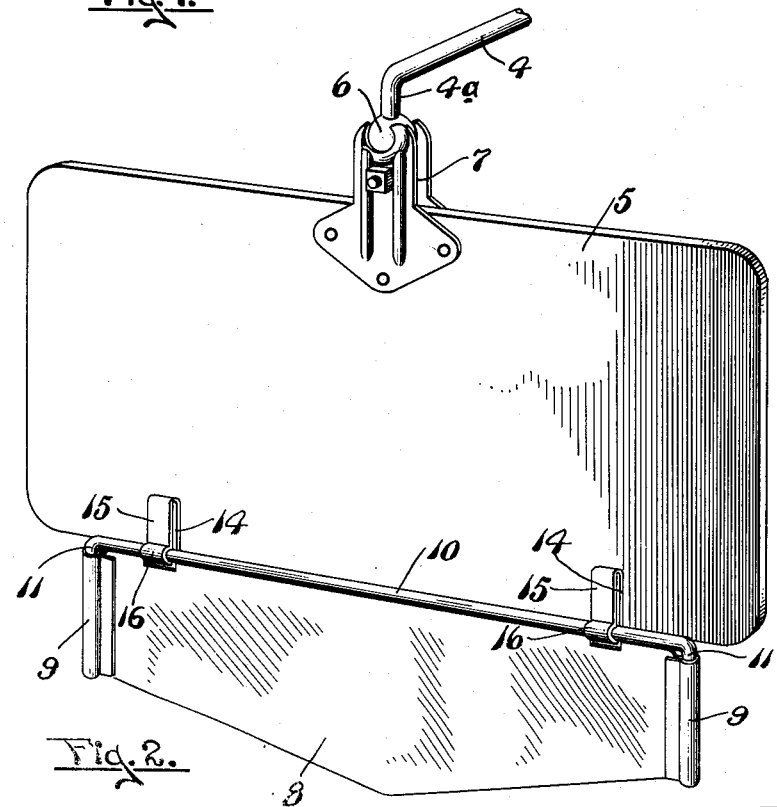
Fig. 2 is a perspective view enlarged, showing the main visor and the auxiliary visor or visorette attached thereto.

In Figs. 6 and 7 slightly different forms of attaching clips are shown. The visor board 5 in Figs. 2 and 5 is a plane board, but in many cases such visor boards are provided with beads adjacent the free edges. For example, in Fig. 6 a bead 5a is made at one side of the visor board 5, this requiring that the leg 12 be modified as indicated at 12a in Fig. 6, the upper end thereof being formed with a bead to pass over the bead 5a and the visor board.

Similarly in Fig. 7 where the bead 5b on the visor board projects outwardly at both sides thereof the legs 12 and 14 of the structure shown in Fig. 5 are formed with outwardly curved intermediate portions, as indicated at 12b and 14a, and the leg 15a is likewise formed so as to be spaced from and substantially concentric with the curved portion of the leg 14a. In all cases the clip frictionally engages with the board 5 and the part 16 serves as a retainer for the member 10 of the auxiliary visor frame and presses the same with a spring effect against the adjacent part of the leg 14, thus permitting the auxiliary visor to be moved to different positions with respect to the main visor 5 and be yieldingly held in any position to which adjusted.

The auxiliary visor may be conveniently and usefully applied to other objects and particularly to other parts of an automobile than the visor as heretofore described. Fig. 1 shows the auxiliary visor applied both to the upper edge of the glass of a side door next to the driver and to the lower edge of the windshield. The attaching clips will readily fit over and grip the glass in either of such locations. In either of these uses the auxiliary visor may be slid lengthwise of the edge of the glass and may be pivoted to the desired angular adjustment so that it will intercept any objectional rays of strong light which may interfere with the driver's sight. Such uses of the auxiliary visor are desirable to screen sunlight coming from the side, reflected light coming from below the natural line of vision or artificial lights such as headlights of approaching automobiles.

The term "translucent" as herein used is intended to define a partly transparent material such as colored celluloid which will absorb strong rays of light but will permit visibility of objects therethrough.

The construction described is of a very simple and economical character and may be readily manufactured at low cost. It is a very desirable adjunct to the ordinary permanent opaque visors which are now very generally installed in automobiles.

The invention is defined in the appended claim and is to be considered comprehensive of all forms of structure coming within its scope.

I claim:

A visor of the class described comprising, a flexible sheet of celluloid having parallelly located eyes at its opposite ends and a frame therefor comprising, a single piece of rod lying in a flat plane but having its middle portion bowed to a slight degree and its respective end members extending laterally in the same direction from said middle portion in the same flat plane at angles substantially equal to 90°, said end members of the frame being attached to the respective end portions of the sheet of celluloid with the frame flexed out of normal position with its bow eliminated and in position wherein its middle portion is substantially straight and its end members extend at substantially right angles from the middle portion whereby the end members may be slid into said parallelly located eyes so that upon release of the flexing pressure the frame will exert a constant tension on said sheet and the middle portion will be adjacent the edge of said sheet whereby one's vision through the sheet will not be interfered with.

WARREN H. STANSBERRY.